(12) United States Patent
Pettersson et al.

(10) Patent No.: US 9,683,833 B2
(45) Date of Patent: Jun. 20, 2017

(54) SURVEYING APPARATUS HAVING A RANGE CAMERA

(71) Applicant: HEXAGON TECHNOLOGY CENTER GMBH, Heerbrugg (CH)

(72) Inventors: Bo Pettersson, London (GB); Knut Siercks, Mörschwil (CH); Eugen Voit, Au (CH); Jürg Hinderling, Marbach (CH); Benedikt Zebhauser, Rorschach (CH); Klaus Schneider, Dorndirn (AT)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 323 days.

(21) Appl. No.: 14/398,420

(22) PCT Filed: May 2, 2013

(86) PCT No.: PCT/EP2013/059195
§ 371 (c)(1),
(2) Date: Oct. 31, 2014

(87) PCT Pub. No.: WO2013/167472
PCT Pub. Date: Nov. 14, 2013

(65) Prior Publication Data
US 2015/0085110 A1    Mar. 26, 2015

(30) Foreign Application Priority Data
May 7, 2012 (EP) ..................................... 12167004

(51) Int. Cl.
*H04N 7/00*    (2011.01)
*G01B 11/14*    (2006.01)
(Continued)

(52) U.S. Cl.
CPC .............. *G01B 11/14* (2013.01); *G01C 11/02* (2013.01); *G01C 15/02* (2013.01); *G01S 5/16* (2013.01);
(Continued)

(58) Field of Classification Search
CPC .......... G01S 17/89; G01S 17/06; G01S 17/87; G01S 7/4808; G01S 5/16; G01S 7/51;
(Continued)

(56) References Cited

U.S. PATENT DOCUMENTS

| 8,018,579 B1 | 9/2011 | Krah | |
| 2003/0179361 A1* | 9/2003 | Ohtomo | G01C 1/02 356/4.01 |

(Continued)

FOREIGN PATENT DOCUMENTS

WO    2012/032687 A1    3/2012

OTHER PUBLICATIONS

European Search Report dated Sep. 26, 2012 as received in Application No. EP 12 16 7004.

*Primary Examiner* — Sath V Perungavoor
*Assistant Examiner* — Peet Dhillon
(74) *Attorney, Agent, or Firm* — Maschoff Brennan

(57) ABSTRACT

Embodiments described herein include a surveying apparatus for surveying a measurement scenery. The surveying apparatus may include a base defining a vertical axis; a support tiltable around the vertical axis; a telescope unit tiltable around the vertical axis and around a horizontal axis that is orthogonal to the vertical axis and comprises means for distance measurement; motor means for rotational driving of the support and the telescope unit; and angle determination means for detecting an orientation of the telescope unit with respect to the base. In some embodiments, the telescope unit comprises a first camera capable to take a (Continued)

visible image of the measurement scenery and/or means for capturing coordinates of 3D-points of the measurement scenery. In some embodiments, the surveying apparatus comprises a display capable to display at least a portion of the visible image taken by the first camera and/or at least a portion of the 3D-points.

18 Claims, 5 Drawing Sheets

(51) Int. Cl.
| | |
|---|---|
| *G01S 17/06* | (2006.01) |
| *G01S 17/87* | (2006.01) |
| *G01S 17/89* | (2006.01) |
| *G01S 5/16* | (2006.01) |
| *G01S 7/48* | (2006.01) |
| *G01S 7/51* | (2006.01) |
| *G06F 3/01* | (2006.01) |
| *G06F 3/03* | (2006.01) |
| *H04N 5/232* | (2006.01) |
| *G01C 11/02* | (2006.01) |
| *G01C 15/02* | (2006.01) |

(52) U.S. Cl.
CPC .............. *G01S 7/4808* (2013.01); *G01S 7/51* (2013.01); *G01S 17/06* (2013.01); *G01S 17/87* (2013.01); *G01S 17/89* (2013.01); *G06F 3/017* (2013.01); *G06F 3/0304* (2013.01); *H04N 5/23293* (2013.01)

(58) Field of Classification Search
CPC ... H04N 5/23293; G06F 3/017; G06F 3/0304; G01B 11/14; G01C 11/02; G01C 15/02
USPC ........................................................ 348/140
See application file for complete search history.

(56) References Cited

U.S. PATENT DOCUMENTS

| | | | |
|---|---|---|---|
| 2005/0099637 A1* | 5/2005 | Kacyra | G01B 11/002 356/601 |
| 2006/0158423 A1 | 7/2006 | Kern et al. | |
| 2006/0192946 A1 | 8/2006 | Walser | |
| 2007/0104353 A1* | 5/2007 | Vogel | G01C 1/04 382/106 |
| 2012/0056989 A1* | 3/2012 | Izumi | H04N 13/0014 348/46 |
| 2012/0242800 A1* | 9/2012 | Ionescu | G06F 3/017 348/46 |
| 2013/0162469 A1* | 6/2013 | Zogg | G01C 15/002 342/357.25 |

* cited by examiner

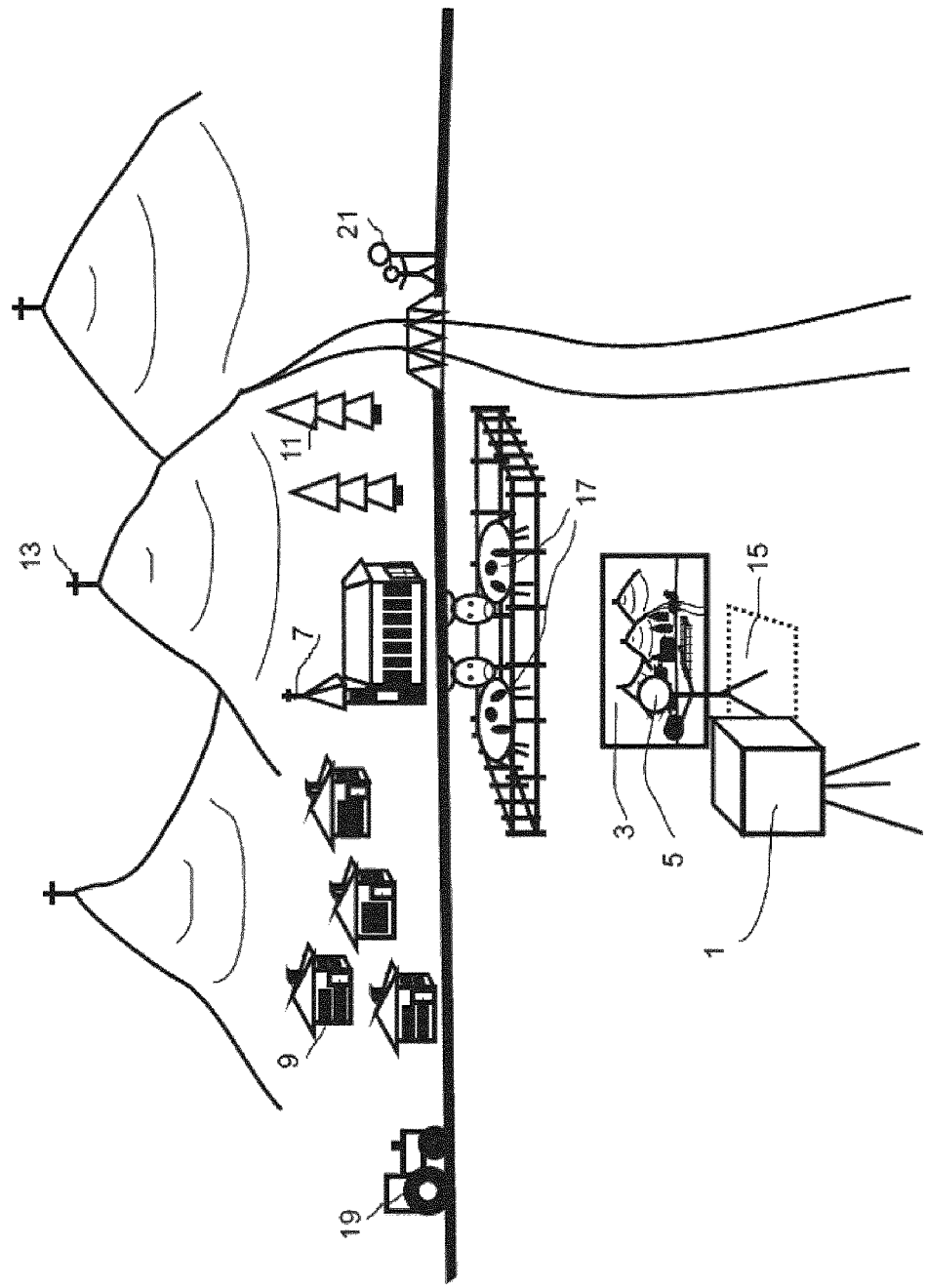

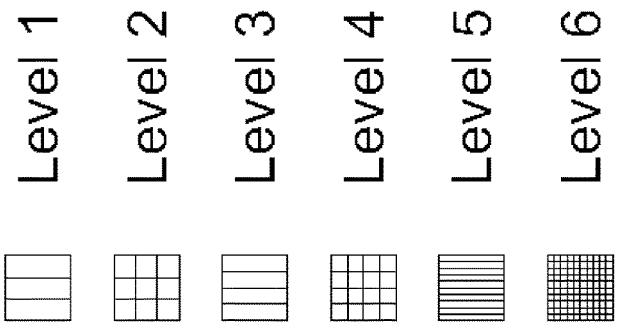
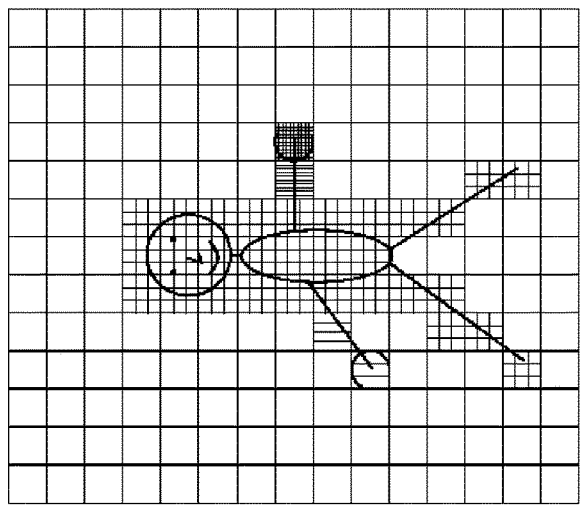
Fig. 3b
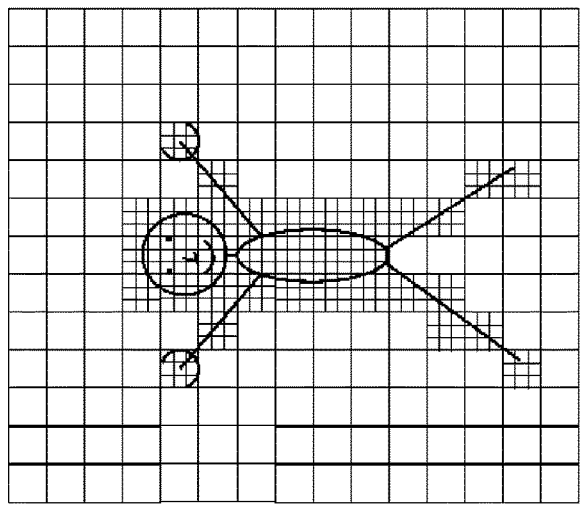
Fig. 3a

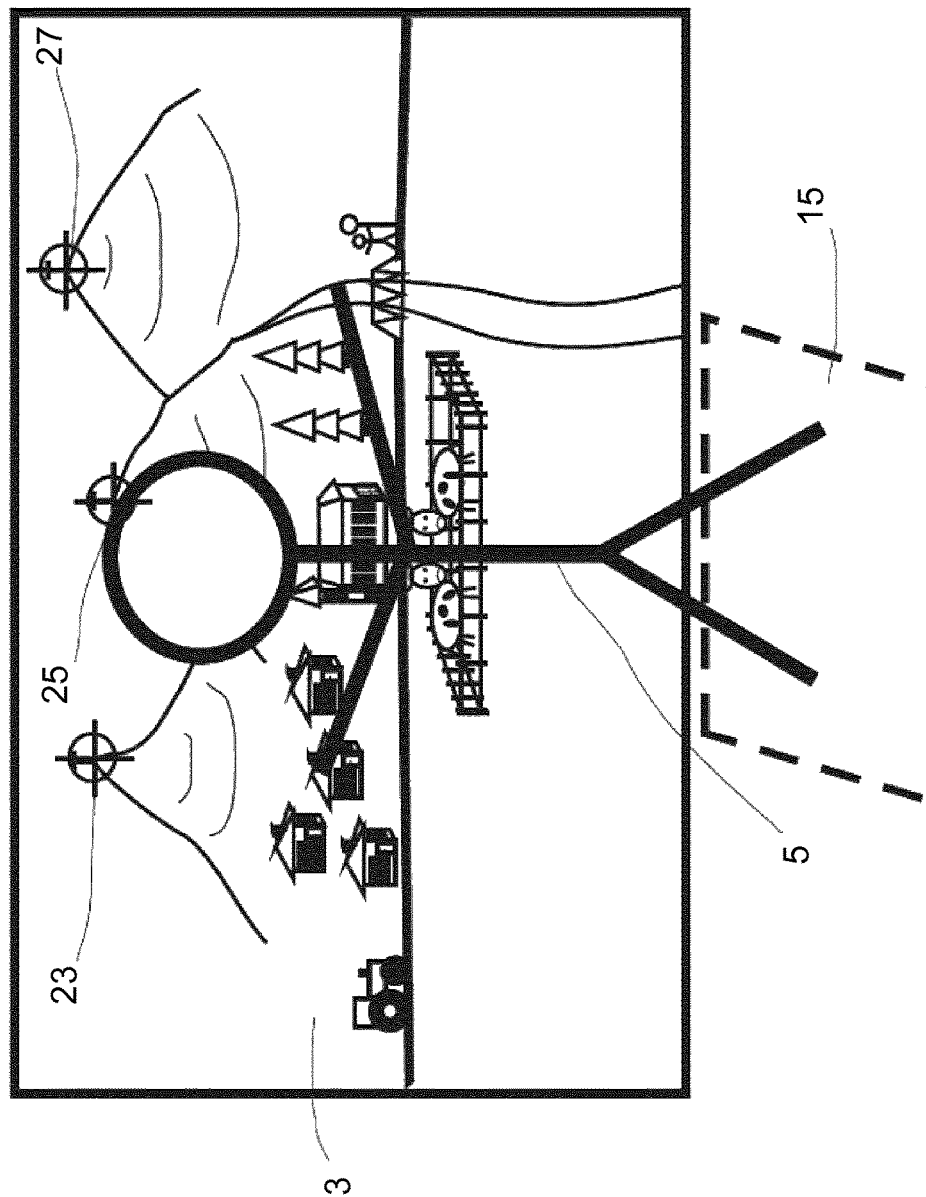

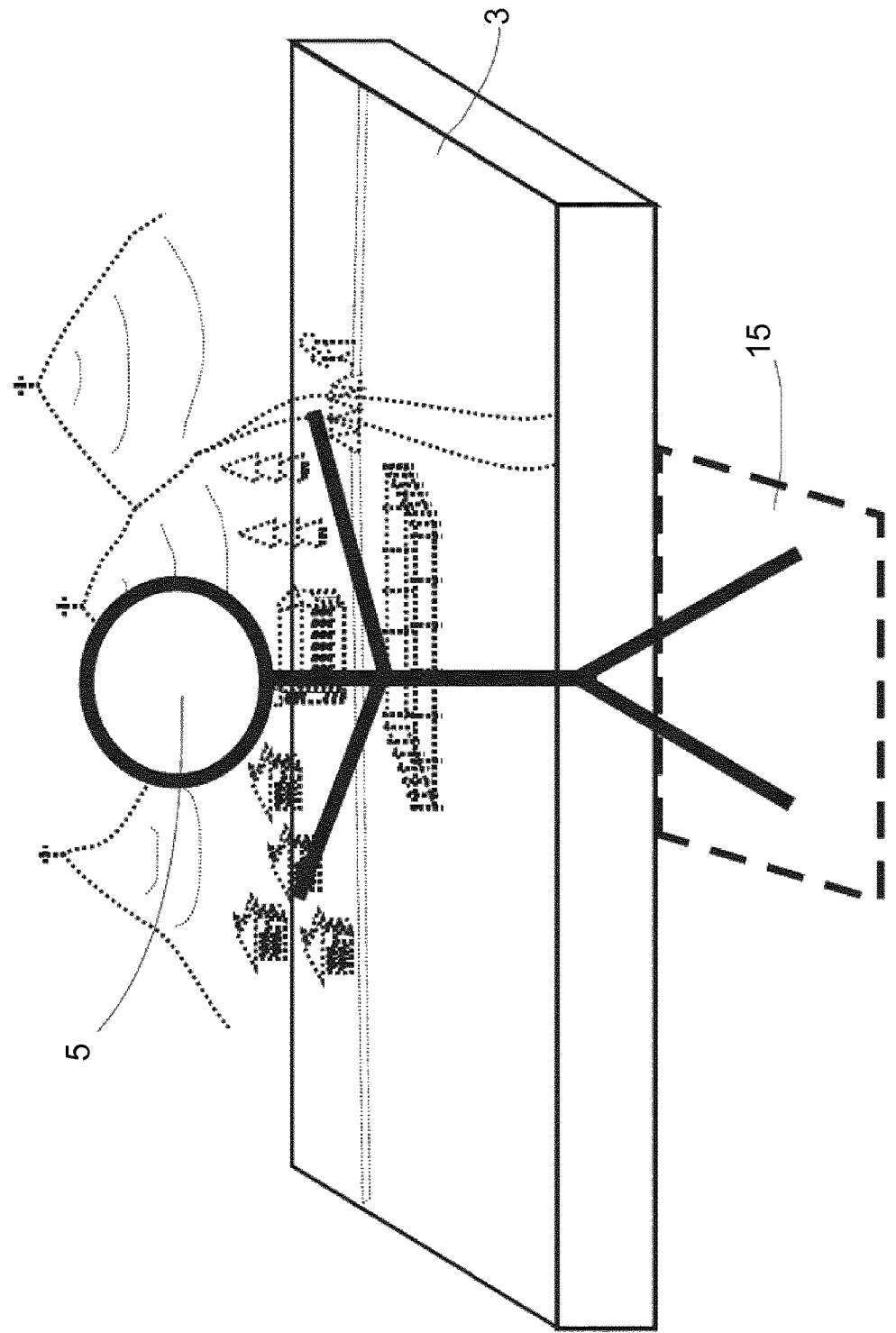

SURVEYING APPARATUS HAVING A RANGE CAMERA

FIELD OF THE INVENTION

The present invention relates to a surveying apparatus having a range camera and to a surveying method.

BACKGROUND

In prior art plural kinds of surveying apparatuses such as total stations are known. Various means and methods are used for controlling such total stations. For instance, touch screen displays are known in order to determine measuring points after an image of the measurement scenery has been taken. In order to determine a measurement point, the user touches the image showing the respective point. By other means such as edge extraction the measurement point chosen e.g. by the user tipping his finger on the point, can be more accurately determined and marked on the image. Then the measurement or surveying of the chosen point for instance in a single surveying action or in the course of a surveying path can take place. That is, in this manner it is also possible to choose a plurality of measurement points, for instance to create a measurement path.

In some cases a detailed determination of a measurement point appears difficult because the common displays generally used with prior art surveying apparatuses are rather small. Therefore, also the size of the measurement scenery images is rather small. If merely a portion of the measurement scenery image is shown, it is quite cumbersome to move the image portion shown on the display to correspond to a desired area of the measurement scenery.

Thus, there is need to provide a surveying apparatus and a surveying method capable to facilitate control steps performed by a user.

SUMMARY

According to the invention, a surveying apparatus for surveying a measurement scenery comprises
  capturing means for capturing coordinates of 3D-points of the measurement scene, and/or
  a first camera that is capable to take a visible image of the measurement scenery.

In particular, the surveying apparatus can be a 3D laser scanner that is capable to capture coordinates of a multitude of 3D-points of the measurement scenery, particularly a point cloud, or a total station that is capable to capture coordinates of surveying points of the measurement scenery. Obviously, also a combination of a total station and a scanner can be used.

Furthermore, a display is provided which is capable to display at least a portion of the visible image and/or the 3D-points. If a camera is provided, the display preferably is capable to display three-dimensional points captured by the capturing means in the visible image taken by the camera. Preferably, the display is also capable to display pre-stored digital terrestrial models of the measurement scenery and to overlay 3D-points captured by the capturing means on this model.

Furthermore, according to the invention a range camera is directed towards the display and capable to take range images of the user positioned at the display. Furthermore, a controller is provided which is capable to analyze the range images with regard to changes caused by a movement of the user, and to control the surveying apparatus on the basis of the changes in the range image to perform predetermined tasks.

Range imaging in general is known as a technology which is used to produce a 2D-image showing the distance to points in a scene from a specific point. The resulting image, which is generally called range image, has pixel values, which correspond to the distance of the respective target point at the object.

For instance, brighter values mean shorter distances or vice versa. It is even possible to properly calibrate the sensor producing such a range image which enables that pixel values can be given directly in physical units such as meters. For each of the pixels of the range image (range pixels) one separate sensor capable to measure a distance is assigned. Since the distance of the target point assigned to the respective sensor (pixel) is known, the 3D-position of the target point can be exactly determined.

Thus, by using the range imaging technology, it is possible to identify each of measurement points of a user operating the surveying apparatus, and to even determine each measurement point's 3D-data. Here, a measurement point of the user can be the end of an extremity such as a hand or a finger tip.

The term "range images" in the terminology of the invention generally means a sequence of range images shot, but can also mean a range image stream taken by a streaming range camera.

According to the invention, a user operating the surveying apparatus by moving his body or extremities, such as arms, legs, hands or feet, leads to that in the range image of the user changes can be determined. Since the change of the 3D-position of an extremity of the user is recognized by the controller, a corresponding movement of the user can be determined and an action or task corresponding to this certain movement can be performed.

According to the invention, the display can be a 3D-display, which is capable to display a 3D-image of the portion of the visible image.

The 3D-image can be generated by any known 3D-imaging method. In particular it can be one of the following methods: stereoscopy, auto-stereoscopy, computer generated holography or volumetric display technique.

In particular, the volumetric display technique is preferred, because here a direct interaction between the user and the 3D-image can be possible. That is, by volumetric display technique through 3D-images can be shown which can be looked at from any arbitrary side. Furthermore, it can be possible to position an object or an extremity directly in this 3D-image. Thus, although the 3D-image is not a real object, it is possible to touch the 3D-image.

Furthermore, although it is not visible for a watching person, stereoscopy can be used under certain circumstances. Since this technique requires special spectacles for the user to be able to see two similar images as one 3D-image, touching into the 3D-image in general is possible. However, in order to determine the point of the 3D-image being touched by the user, the user's eye's exact position must be known, because the coordinates of the touched point in the 3D-space depend on the user's position.

Since the 3D-image is produced by the controller, and all 3D-coordinate data points of the displayed objects are known, it is possible to compare these known 3D-coordinates with the 3D-coordinates of the moving user known from the range image in order to determine whether the user touches a certain object or target point in the 3D-display.

Advantageously, a map can be provided, in which predetermined changes of the range images corresponding to respective user movements are assigned to predetermined tasks, and the controller is capable to ignore unassigned changes of the range image.

Since merely certain movements are assigned to predetermined tasks, the computing power can be reduced, because the controller is able to immediately exclude movements that are not intended to be a command to the surveying apparatus.

Furthermore, advantageously, learning means can be provided to learn range image changes corresponding to respective user movements in order to be assigned to respective predetermined tasks and/or to be stored in a map. That is, according to the invention, for the user it is possible to define certain movements and to assign these movements to a predetermined task. Furthermore, it is possible to store these movements and the corresponding predetermined tasks in a map. Thus, the operability of the surveying apparatus can be improved.

According to the invention, a surveying method using a surveying apparatus comprises capturing coordinates of 3D-points of a measurement scenery with the surveying apparatus and/or taking an image of the measurement scenery with a first camera, and displaying at least a portion of the image and/or the 3D-points of the measurement scenery on a display.

Furthermore, the method comprises taking a sequence of range images of a user positioned at the display, analyzing movements of the user on the basis of changes in the individual range images of the sequence, and controlling the total station to perform tasks corresponding to the user movements.

Thus, according to the invention, since the movements of the user can be analyzed on the basis of changes in the individual range images taken by the range camera, it is possible to assign certain movements to corresponding tasks of the surveying apparatus in order to control the surveying apparatus. Thus, it is not necessary to depend on a rather small touch screen display, but a quite large display such as a big TV screen or a display composed of plural TV screens can be used to display the portion of the image of the measurement scenery, while the user's movements for controlling the surveying apparatus in relation to the display can be analyzed. Preferably, also digital terrestrial models, for instance pre-stored images and/or point clouds of the actual measurement scenery, can be displayed on the display and combined with images or 3D-points of the measurement scenery captured by the first camera or the capturing means, respectively.

Advantageously, the portion of the image and/or the 3D-points of the measurement scenery being displayed is a 3D-image.

Advantageously, plural surveying apparatuses can be provided at different locations to take images of the same measurement scenery from different viewpoints. In this case, the portion of the image and/or the 3D-points of the measurement scenery is composed from image information from all of the images of the different surveying apparatuses.

The features of the above paragraph enable improving the quality of the 3D-image, because the measurement scenery is taken from different locations. Accordingly, areas not directly visible from the one surveying apparatus can be shot or surveyed by one of the other surveying apparatuses. Therefore, the quality of the 3D-image can be improved. In order to exchange data between the different surveying apparatuses, preferably wireless communication methods such as radio or use of mobile networks e.g. short message service or others can be employed.

The 3D-image can be generated by one of stereoscopy, auto stereoscopy, computer generated holography or volumetric display technique.

In particular the volumetric display technique is preferred for displaying the 3D-image, because this technique enables an interaction between a user and the image in a manner that the user can kind of touch the objects displayed in the 3D-image.

Advantageously, the method of the invention can comprise a learning step in which changes of the range images caused by certain user movements are assigned to predetermined tasks.

This enables the user to define certain preferred movements in order to teach the surveying apparatus tasks corresponding to the certain preferred movements. It is even possible to store these movements and the assigned tasks in a map for later use.

Advantageously, the portion of the image and/or the 3D-points of the measuring scenery can be analyzed and possible target points can be marked by overlaying the portion of the image of the measuring scenery with marking symbols.

Thus, when operating the surveying apparatus, due to the analyses of the measurement scenery and the markings of possible target points, the user can much easier choose a certain target point in the 3D-image. It can be even possible to perform a command to move a marking in case the corresponding target point is not properly assigned.

Furthermore, advantageously, a target point chosen by the user can have its marking highlighted, and a predetermined user movement can cause that another target point is also highlighted.

Another target point can be any of the target points displayed in the 3D-image, that is, an adjacent target point of the firstly highlighted target point or a target point being more distant. Furthermore, by highlighting plural target points one after the other, a measurement path for performing subsequent measurements can be defined. It is also possible to extinguish the highlighting of some or all of the markings in order to remove target points from the measurement path.

Advantageously, a predetermined user movement can cause an increase or a decrease of the size of the portion of the image and/or the 3D-points of the measurement scenery. Furthermore or alternatively, another user movement can cause a rotation of the portion of the image and/or the 3D-points of the measurement scenery.

Thereby it is possible to zoom into the 3D-image or to zoom out of it. Furthermore, in order to facilitate access to certain objects, it can be possible to rotate the 3D-image. In particular this rotation is facilitated, if plural surveying apparatuses are provided. If there is only one surveying apparatus provided, areas being not visible for the one surveying apparatus cannot be properly displayed.

BRIEF DESCRIPTION OF THE DRAWINGS

The invention in the following will be described in detail by referring to exemplary embodiments that are accompanied by figures, in which:

FIG. 2 is a schematic view of a measurement scenery with a surveying apparatus according to the invention;

FIGS. 3a and 3b are schematic images of RIM images of the user performing certain movements;

FIG. 4 is a schematic view of a user operating a total station using a 2D-image; and FIG. 5 is a schematic view of a user operating a total station using a 3D-image.

DETAILED DESCRIPTION

Preferred embodiments of the invention will be described on the basis of FIGS. 1 to 5.

Figure 1A:
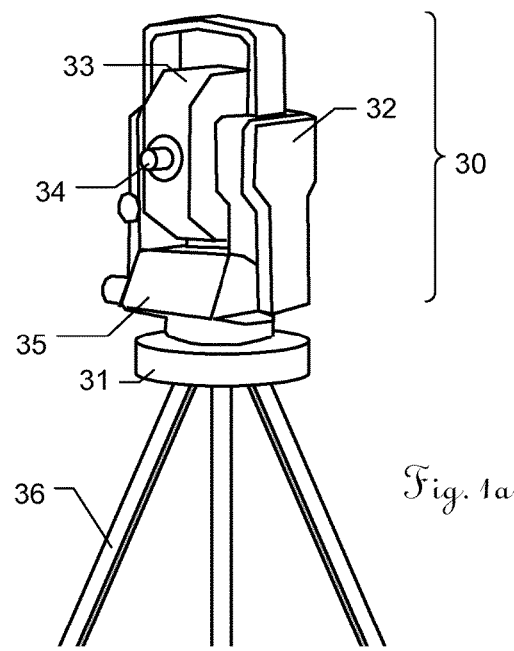
FIGS. 1a and 1b are schematic views of a total station and a laser scanner as two exemplary embodiments of a surveying apparatus according to the invention.

FIG. 1a shows a total station as a first embodiment of a surveying instrument according to the invention. The depicted exemplary total station is adapted for measuring horizontal and vertical angles and distances to a remote target object.

The total station is provided on a tripod 36, a base 31 of the total station being directly fixed on the tripod 36. The main part 30 of the total station is rotatable relative to the base 31. The main part 30 comprises a support 32, in this exemplary embodiment being formed by two columns. Between the columns a telescope unit 33 is supported tiltably around the horizontal axis. Furthermore, the main part 30 comprises display and controlling means 35 which can be suitable in a known manner for controlling the total station and for processing, displaying and storing measurement data.

The telescope unit 33 is arranged on the support 32 tiltably around a horizontal axis and thus can be rotated horizontally and vertically with respect to the base 31. Motor means (not shown) are provided for performing the required tilting movements for the alignment of the telescope unit 33.

The telescope unit 33 can be built as a component unit, wherein an optical system, a coaxial camera sensor, an eyepiece 34 and a graphics processor are integrated in a common telescope unit housing. The telescope unit 33 can be aimed at a target object so that the distance from the total station to the target object can be detected by means of electronic sensors. Furthermore, electronic sensor means (not shown) are provided for detecting an angular orientation of the main part 30 relative to the base 31 and of the telescope unit 33 relative to the support 32. The data are sent to the display and controlling means 35 and processed so that the position of the target point relative to the total station is detectable, displayable and storable by the display and controlling means 35.

Figure 1B:
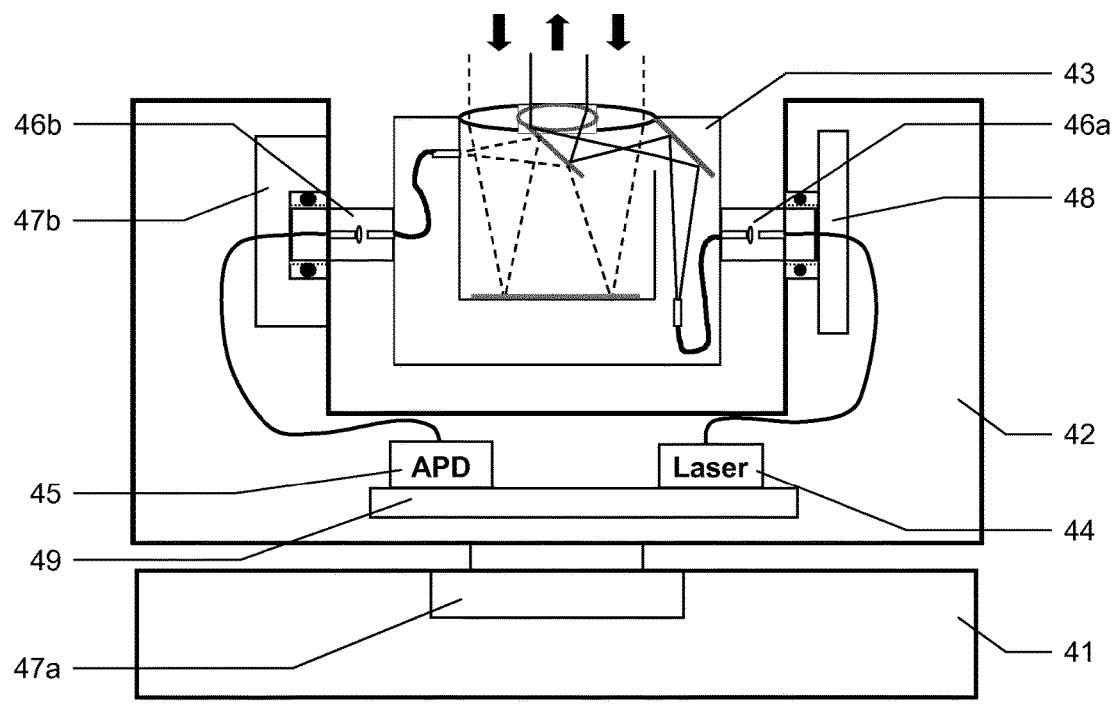

FIG. 1b shows a sectional view of a laser scanner as a second embodiment of a surveying instrument according to the invention. The depicted exemplary laser scanner comprises a stator 41, a rotor 42 that is mounted on the stator 42 to be rotatable about a first rotational axis, and a rotary body 43 that is mounted on the rotor 42 to be rotatable about a second rotational axis. In the rotor 42 a laser source 44 and a detector 45 are arranged. On two sides of the rotary body 43 between the rotor 42 and the rotary body 43 optical links 46a,b are provided on the second rotational axis in such a way that emission light can be introduced by the laser source 44 into the rotary body 43 via the first optical link 46a and reception light can be discharged from the rotary body 43 via the second optical link 46b. A first rotary drive 47a drives the rotor 42 and a second rotary drive 47b drives the rotary body 43. Two goniometers 48 and evaluation electronics 49 which are connected to the laser source 44 and the detector 45 allow association of a detected distance with a corresponding direction. Obviously, also other forms of 3D laser scanners, for example having a mirror instead of a rotary body with optical links, are equally adequate.

This far the surveying instruments shown in FIGS. 1a and 1b are known from prior art. According to the invention, additionally a display and a range camera are provided (not shown). The range camera is directed towards the display and capable to take a range image of a user positioned at the display.

FIG. 2 is a schematic view of a measurement scenery. Main objects in the measurement scenery are a church 7, a house 9, a tree 11 and a mountain peak 13. A total station 1 is provided as an example for a surveying apparatus, comprising a first camera for taking a real image of the measurement scenery. Furthermore, the total station 1 is provided with a range camera, in particular a RIM-camera.

The range camera is directed to a display 3 located near the total station 1 and takes a sequence of range images. Movements of a user 5 located at the display 3 can be determined as changes in the range images taken by the range camera.

For this purpose, a control unit provided in the total station 1 can determine certain movements of the user 5 and have the total station 1 to perform certain surveying tasks and other tasks. Some of these tasks will be described below.

Thus, by moving his extremities or performing other movements, the user 5 can give commands in order to control the total station 1. In the image, the measured distances are displayed on the basis of six brightness levels. Brightness level 1 means that the point displayed with the brightness level is closest, while brightness level 6 means that the corresponding displayed point is most distanced.

FIG. 3a shows an initial position of the user 5 standing in about the middle of the range which can be displayed. Thus, the images displaying the user 5 have brightness level 4.

FIG. 3b shows a change in that the user 5 has lowered his left arm towards a horizontal position and has moved it backwards. Furthermore, the user 5 has moved his right arm fully downwards and forwards. Accordingly, the left hand of the user 5 is most distanced from the RIM-camera in the total station 1 and the pixels of the range image corresponding to the left hand are quite dark (brightness level 6). In contrast, the right hand of the user 5 is quite near to the RIM-camera in the total station 1 and, thus, the pixels corresponding to its left hand are quite bright (brightness level 1).

Thus, by determining the user's movements on the basis of the changes of the range images, the controller issues certain commands in order to have the total station 1 perform various actions and/or surveying tasks. For instance, the user can define a measurement path, can define additional measurement points, can zoom into the image or zoom out of the image, can switch on images taken by additional total stations or can quit the measurement.

In order to perform an accurate control by the user 5 and to prevent erroneously given commands, in the range image a certain section corresponding to a control zone 15 marked by a dashed line is defined. For determining the user's 5 movements, the user 5 must be present in this control zone 15. Accordingly, if the user 5 steps out of the control zone 15, although changes of the user's 5 posture can still be visible in the range images, the controller will ignore the changes and, thus, the total station 1 will not react upon the user's 5 commands.

Preferably, the control zone 15 can be in the form of a small platform or depression.

In FIGS. 3a and 3b, the white fields correspond to points falling out of the measuring range of the RIM-camera.

FIG. 4 shows a display 3 displaying the measurement scenery of FIG. 1 in a two-dimensional manner. The user 5 is located close to the display 3, in order to be able to point at the objects displayed. For instance, the user may point at the top of the church 7, at the tree 11, at the house 9 or at the mountain peak 13.

The presentation in a two-dimensional display, as is the case in this embodiment, even enables to show moving elements such as the house 17 or the traction engine 19. Therefore, e.g. a person 21 showing a surveying pole at a predetermined location and then moving to another location can be also displayed. In order to enable the displaying of moving elements, the first camera in the surveying apparatus 1 has to take an image stream which is then displayed on the display 3.

Since the user 5 is located at the display 3, he is in a position to point to a chosen target point with one hand. This movement is recognized due to changes in the range image of the user. Since the 3D-position of the user's hand is exactly known, it can be assigned to a corresponding pixel in the display 3. Therefore, it is possible to exactly determine the object the user 5 is pointing at. By moving his other arm, the user 5 can initiate an action such as marking the chosen target point by a marking 23,25,27 in the image. Furthermore, certain similar movements serve for marking other target points by additional markings. Then, the user can initiate a surveying action along the surveying path e.g. along the markings 23,25,27.

Other possible actions are zooming into the picture or zooming out of the picture removing markings, shifting markings etc. If plural total stations are provided at different locations, by a certain movement the user can initiate switching from one total station's view to another total station's view. It is also possible to split the image in the display 3 to two or more images in order to display the images of different total stations at the same time.

Instead of using actual images of the first camera it is also possible to have a pre-stored digital terrestrial model of the measurement scenery displayed on the display 3, and to overlay measurement points on the model.

FIG. 5 shows an embodiment, in which the display is a 3D-display. There are certain 3D-displaying techniques available, such as stereoscopy, auto-stereoscopy, computer-generated holography or volumetric display techniques. In this embodiment, preferably a 3D-technique using voxels is used. In 3D-displaying technique, a voxel (volume pixel) is a three-dimensional object point, corresponding to a pixel in a 2D-image.

In spite of the technical effort to provide the 3D-image in the form of voxels, this technology has the advantage that the user can directly touch the objects in the 3D-image. With other kinds of 3D-techniques, this would not be possible.

The display 3 in FIG. 5 displays the measurement scenery of FIG. 2. In order to obtain the data for the 3D-display, known techniques such as stereoscopy, auto stereoscopy, computer-generated holography or volumetric display technique or range imaging can be employed. In case of range imaging, a second range camera is to be used for obtaining the 3D-data of the measurement scenery.

As was described with regard to FIG. 4, by touching an object in the 3D-display, the user 5 can mark certain target points, can initiate a surveying action e.g. via a chosen surveying path or even zoom into or out of the 3D-image. Furthermore, the user can cause a rotation of the 3D-image as well. In order to display areas not visible for the total station, advantageously, additional total stations can be provided at different locations.

While the description of FIG. 4 pertains to a 2D-display, it is to be noted that even here displaying in a 3D-manner is possible if the stereography technique is provided. That is, by providing two images of the same scenery, in which the image axes are slightly different, a three-dimensional effect can be made available, for instance if the user watches the display from a certain angle or wears special spectacles.

In this case it is possible, to give the user a 3D-display, although another person watching the display from the outside would merely see the two images shifted against each other. The user, however, has a clear 3D-image and can even interact with the 3D-image as is the case with the 3D-image based on the volumetric display technique.

While the invention has been described with reference to presently preferred embodiments, it is to be noted that the scope of the invention is defined by the attached claims.

What is claimed is:

1. A surveying apparatus for surveying a measurement scenery, the surveying apparatus comprising:
   a base defining a vertical axis;
   a support tiltable around the vertical axis;
   a telescope unit tiltable around the vertical axis and around a horizontal axis that is orthogonal to the vertical axis and comprises means for distance measurement;
   at least one motor for rotational driving of the support and the telescope unit; and
   an electronic angle sensor for detecting an orientation of the telescope unit with respect to the base,
   wherein the telescope unit comprises a first camera configured to take a visible image of the measurement scenery and a laser source and detector for capturing coordinates of 3D-points of the measurement scenery,
   wherein the surveying apparatus comprises a display configured to display at least a portion of the visible image taken by the first camera and/or at least a portion of the 3D-points, respectively, and
   wherein a range camera directed towards the display and configured to take a range image of a user positioned at the display, and
   wherein the surveying apparatus comprises an electronic controller having a processor, which is configured to analyze the range image with regard to changes caused by a movement of the user, and to control the surveying apparatus on the basis of the changes in the range image to perform predetermined surveying tasks.

2. The surveying apparatus according to claim 1, wherein the range camera comprises a RIM-camera.

3. The surveying apparatus according to claim 1, wherein the display is a 3D-display configured to display a 3D-image of the portion of the visible image and/or the 3D-points.

4. The surveying apparatus according to claim 3, wherein the 3D-image is generated by stereoscopy, auto stereoscopy, computer generated holography or volumetric display technique.

5. The surveying apparatus according to claim 3, wherein the display is configured to display a digital terrestrial model of the measurement scenery.

6. The surveying apparatus according to claim 3, wherein a map is provided in which predetermined changes of the range image corresponding to respective user movements are assigned to predetermined tasks, and the electronic controller is configured to ignore not assigned changes of the range image.

7. The surveying apparatus according to claim 3, wherein learning means is provided to learn range image changes corresponding to respective user movements in order to be assigned to respective predetermined tasks and/or to be stored in a map.

8. The surveying apparatus according to claim 3, wherein the surveying apparatus is a total station.

9. A surveying method using a surveying apparatus, the surveying apparatus comprising:
- a base defining a vertical axis;
- a support tiltable around the vertical axis;
- a telescope unit tiltable around the vertical axis and around a horizontal axis that is orthogonal to the vertical axis and comprises means for distance measurement;
- at least one motor for rotational driving of the support and the telescope unit; and
- an electronic angle sensor for detecting an orientation of the telescope unit with respect to the base, the method comprising:
- taking an image of a measurement scenery with a first camera and/or capturing coordinates of 3D-points of a measurement scenery,
- displaying at least a portion of the image and/or the 3D-points, respectively, of the measurement scenery on a display,
- taking a sequence of range images of a user positioned at the display,
- analyzing movements of the user on the basis of changes in the individual range images of the range image sequence, and
- controlling the surveying apparatus to perform surveying tasks corresponding to the user movements.

10. The surveying method according to claim 9, wherein the portion of the image and/or the 3D-points, respectively, of the measurement scenery is a 3D-image.

11. The surveying method according to claim 10, wherein the 3D image is displayed in a manner that a user can access image points.

12. The surveying method according to claim 9, wherein plural surveying apparatuses are provided at different locations to take images and/or 3D-points of the same measurement scenery from different viewpoints, and wherein the portion of the image and/or the 3D-points, respectively, of the measurement scenery is composed from image information and/or 3D-points information, respectively, from all of the images and/or 3D-points, respectively, of the different surveying apparatuses.

13. The surveying method according to claim 9, wherein the 3D-image is generated by one of auto-stereoscopy, computer generated holography or volumetric display technique.

14. The surveying method according to claim 9, further comprising a learning step in which changes of the range images caused by certain user movements are assigned to predetermined tasks.

15. The surveying method according to claim 14, wherein the portion of the image of the measurement scenery is analyzed, and possible target points are marked by overlaying the portion of the image of the measurement scenery with marking symbols.

16. The surveying method according to claim 14, wherein a marking corresponding to a chosen target point is highlighted and a predetermined user movement causes to highlight a marking of a second target point.

17. The surveying method according to claim 9, wherein a predetermined user movement causes an increase or decrease of the size of the portion of the image of the measurement scenery and/or causes a rotation of the portion of the image of the measurement scenery.

18. The surveying method according to claim 9, wherein a digital terrestrial model of the measurement scenery is displayed on the display.

* * * * *